US011041436B2

United States Patent
Jones et al.

(10) Patent No.: US 11,041,436 B2
(45) Date of Patent: Jun. 22, 2021

(54) PROCESS FOR RETROFITTING AN INDUSTRIAL GAS TURBINE ENGINE FOR INCREASED POWER AND EFFICIENCY

(71) Applicant: Florida Turbine Technologies, Inc., Jupiter, FL (US)

(72) Inventors: Russell B. Jones, North Palm Beach, FL (US); Joseph D. Brostmeyer, Jupiter, FL (US); Justin T. Cejka, Palm Beach Gardens, FL (US); John E. Ryznic, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 157 days.

(21) Appl. No.: 16/301,560

(22) PCT Filed: May 15, 2017

(86) PCT No.: PCT/US2017/032709
§ 371 (c)(1),
(2) Date: Nov. 14, 2018

(87) PCT Pub. No.: WO2017/200940
PCT Pub. Date: Nov. 23, 2017

(65) Prior Publication Data
US 2019/0178160 A1    Jun. 13, 2019

Related U.S. Application Data

(63) Continuation of application No. 15/157,269, filed as application No. PCT/US2017/032709 on May 15, 2017, now abandoned.

(51) Int. Cl.
*F02C 3/13* (2006.01)
*F02C 3/00* (2006.01)
(Continued)

(52) U.S. Cl.
CPC ............... *F02C 3/13* (2013.01); *F01D 15/10* (2013.01); *F01D 17/14* (2013.01); *F02C 3/00* (2013.01);
(Continued)

(58) Field of Classification Search
CPC .... F02C 7/042; F02C 9/18; F02C 6/08; F02C 7/18; F02C 9/22; F02C 3/13;
(Continued)

(56) References Cited

U.S. PATENT DOCUMENTS 5,174,105 A * 12/1992 Hines ................. F02C 3/10
60/774
5,553,448 A * 9/1996 Farrell .................. F02C 3/10
29/401.1
(Continued)

FOREIGN PATENT DOCUMENTS

WO    2015038768 A1    3/2015
WO    2015155142 A1    10/2015

OTHER PUBLICATIONS

International Search Report and Written Opinion dated Aug. 16, 2017, for corresponding International Application No. PCT/US2017/032709; International Filing Date: May 15, 2017 consisting of 11-pages.

*Primary Examiner* — Katheryn A Malatek
(74) *Attorney, Agent, or Firm* — Christopher & Weisberg, P.A.

(57) ABSTRACT

A process for retrofitting an industrial gas turbine engine of a power plant where an old industrial engine with a high spool has a new low spool with a low pressure turbine that drives a low pressure compressor using exhaust gas from the high pressure turbine, and where the new low pressure compressor delivers compressed air through a new compressed air line to the high pressure compressor through a new inlet added to the high pressure compressor. The old
(Continued)

electric generator is replaced with a new generator having around twice the electrical power production. One or more stages of vanes and blades are removed from the high pressure compressor to optimally match a pressure ratio split. Closed loop cooling of one or more new stages of vanes and blades in the high pressure turbine is added and the spent cooling air is discharged into the combustor.

15 Claims, 7 Drawing Sheets

(51) Int. Cl.
| | |
|---|---|
| *F02C 6/00* | (2006.01) |
| *F01D 15/10* | (2006.01) |
| *F01D 17/14* | (2006.01) |
| *F02C 7/18* | (2006.01) |
| *F02C 9/18* | (2006.01) |
| *F02C 9/22* | (2006.01) |

(52) U.S. Cl.
CPC ............... *F02C 6/00* (2013.01); *F02C 7/18* (2013.01); *F02C 9/18* (2013.01); *F02C 9/22* (2013.01); *F05D 2220/32* (2013.01); *F05D 2220/76* (2013.01); *F05D 2230/80* (2013.01); *F05D 2240/35* (2013.01); *F05D 2260/202* (2013.01); *F05D 2260/211* (2013.01)

(58) Field of Classification Search
CPC ........... F05D 2230/80; F05D 2260/211; F01D 15/10; F01D 15/12; F01D 17/14
See application file for complete search history.

(56) References Cited

U.S. PATENT DOCUMENTS

| | | | |
|---|---|---|---|
| 7,513,120 B2* | 4/2009 | Kupratis | F01D 15/10 60/39.24 |
| 2007/0256424 A1* | 11/2007 | Briesch | F02C 6/18 60/773 |
| 2010/0164234 A1* | 7/2010 | Bowman | F02C 7/32 290/1 R |
| 2011/0138818 A1* | 6/2011 | Mizukami | F01D 21/00 60/778 |

* cited by examiner

PROCESS FOR RETROFITTING AN INDUSTRIAL GAS TURBINE ENGINE FOR INCREASED POWER AND EFFICIENCY

GOVERNMENT LICENSE RIGHTS

This invention was made with Government support under contract number DE-FE0023975 awarded by Department of Energy. The Government has certain rights in the invention.

CROSS-REFERENCE TO RELATED APPLICATIONS

This application is a Submission under 35 U.S.C. § 371 for U.S. National Stage Patent Application of International Application Number PCT/US2017/032709, filed May 15, 2017, entitled PROCESS FOR RETROFITTING AN INDUSTRIAL GAS TURBINE ENGINE FOR INCREASED POWER AND EFFICIENCY, which claims priority to U.S. application Ser. No. 15/157,269, filed May 17, 2016, the entirety of both of which is incorporated herein by reference.

TECHNICAL FIELD

The present invention relates generally to a power plant with an industrial gas turbine engine, and more specifically to a process for retrofitting an industrial gas turbine engine for increased power and efficiency.

BACKGROUND

Single shaft gas turbine engines are limited in power and efficiency when pressure ratios and firing temperatures are raised to the point where the last turbine stage is loaded to where Mach numbers reach the maximum aerodynamic capability. In these cases, the engine has limited capability to be upgraded for either power or efficiency. In some cases, the two shaft engine configuration is coupled to a larger free spinning turbine with the generator on the low speed shaft to create an upgrade in power. This also has limitations in total flow and is limited in the maximum pressure ratio that the unit could sustain.

SUMMARY

In the present invention, existing single shaft turbine engines are retrofitted with a low pressure turbine coupled to a low pressure compressor that is aerodynamically coupled in front of the existing compressor, now deemed the high pressure compressor, where the existing turbine (now deemed the high pressure turbine) is coupled to the low pressure turbine. Further enhancements to the cooling systems enhance the ability to increase the firing temperature of the existing section of the gas turbine and elevate the overall power rating and efficiency.

A process for retrofitting an industrial gas turbine engine in which a new independently operated low spool shaft with a power turbine and a low pressure compressor is installed with the low pressure compressed air being directed into an inlet of the high pressure compressor. A variable area turbine vane assembly is added to the power turbine and a variable inlet guide vane to the low pressure compressor. In another embodiment, a power turbine that drives an electric generator is retrofitted by using the power turbine to drive a low pressure compressor that feeds low pressure air to an inlet of the high pressure compressor, and relocates the electric generator to the high speed shaft on a cold end of the compressor. Regenerative or closed loop cooling can also be used to increase efficiency by bleeding off air from the compressor, cooling the air and then pressurizing the air further in order to pass through stator vanes for cooling, where the spent cooling air is then discharged into the combustor upstream of the flame. Air for cooling can be bled off from a middle stage of the compressor or from the exit end of the compressor. Or, ambient air from atmosphere can be used with an external compressor to further compress the air to P3 level followed by intercooling prior to cooling of the stator vanes.

In one embodiment, a process for retrofitting an industrial gas turbine engine of a power plant, the industrial gas turbine engine having a main compressor driven by a main turbine and a main electric generator driven by the main turbine, the main compressor having an original inlet, includes the steps of: adding a new inlet to the main compressor, the new inlet replacing the original inlet and being capable of receiving a greater air flow than the original inlet; adding a low spool with a low pressure turbine and a low pressure compressor, the low pressure turbine driving the low pressure compressor to the main turbine such that the low pressure turbine is driven by exhaust from the main turbine; adding a variable inlet guide vane assembly to an inlet side of the low pressure turbine; adding a compressed air line connecting the low pressure compressor to the new inlet of the main compressor such that compressed air from the low pressure compressor flows into the main compressor; and replacing the main electric generator with a new electric generator that has around twice the electrical power production.

In one aspect of the embodiment, the method further includes the step of removing at least one stage of rotor blades and stator vanes from the main compressor to optimally match a pressure ratio split between the low pressure compressor and the main compressor.

In one aspect of the embodiment, the method further includes the steps of: removing at least one row of the stator vanes from the main turbine; installing at least one new row of stator vanes in the main turbine in which the new stator vanes have a closed loop cooling circuit; providing a source of compressed air for cooling of the new row of turbine stator vanes; and discharging spent cooling air from the new row of turbine stator vanes upstream of the main combustor, the main combustor producing a hot gas stream for the main turbine.

In one aspect of the embodiment, the method further includes the steps of: bleeding off cooling air from the main compressor; intercooling the cooling air with an intercooler; increasing a pressure of the cooling air to a pressure slightly higher than an outlet pressure of the main compressor to produce a higher pressure cooling air; and passing the higher pressure cooling air through the closed loop cooling circuit in the at least one new row of turbine stator vanes.

In one aspect of the embodiment, the method further includes the steps of: compressing ambient air with an external cooling air compressor to a pressure slightly higher than an outlet pressure of the main compressor to produce a higher pressure cooling air; intercooling the cooling air with an intercooler; and passing the higher pressure cooling air through the closed loop cooling circuit in the at least one new row of turbine stator vanes.

In one aspect of the embodiment, the method further includes the steps of: bleeding off compressed cooling air from an outlet of the main compressor; intercooling the compressed cooling air with an intercooler; increasing a pressure of the compressed cooling air to a pressure slightly higher than an outlet pressure of the main compressor to produce a higher pressure cooling air; and passing the higher pressure cooling air through the closed loop cooling circuit in the at least one new row of turbine stator vanes.

In one aspect of the embodiment, the method further includes the steps of: bleeding off compressed cooling air from an outlet of the main compressor; increasing a pressure of the compressed cooling air to a pressure slightly higher than an outlet pressure of the main compressor to produce a higher pressure cooling air; intercooling the higher pressure cooling air with an intercooler; and passing the higher pressure cooling air through the closed loop cooling circuit in the at least one new row of turbine stator vanes.

In one aspect of the embodiment, the method further includes the steps of: bleeding off at least a portion of compressed air from the source of compressed air between the low pressure compressor and the main compressor for use as the cooling air for the at least one new row of stator vanes; and cooling and compressing the cooling air to a pressure slightly higher than an outlet pressure of the main compressor.

In one aspect of the embodiment, the method further includes the step of adding a variable inlet guide vane assembly to both the main compressor and the low pressure compressor.

In one embodiment, a process for retrofitting an industrial gas turbine engine of a power plant, the industrial gas turbine engine having a main compressor driven by a main turbine, a power turbine driven by the main turbine, and a main electric generator driven by one of the main turbine and the power turbine, the main compressor having an original inlet, includes the steps of: removing the main electric generator from the power turbine; adding a new inlet to the main compressor, the new inlet replacing the original inlet and being capable of receiving a greater air flow than the original inlet; adding a low pressure compressor to be driven by the power turbine; adding a variable inlet guide vane assembly to an inlet side of the power turbine; adding a compressed air line connecting the low pressure compressor to the new inlet of the main compressor such that compressed air from the low pressure compressor flows into the main compressor; and adding a new electric generator having around twice the electrical power production of the main electric generator to be driven by the main turbine.

In one aspect of the embodiment, the method further includes the step of removing at least one stage of rotor blades and stator vanes from the main compressor to optimally match a pressure ratio split between the low pressure compressor and the main compressor.

In one aspect of the embodiment, the method further includes the step of adding a gearbox between the new electric generator and the main compressor.

In one embodiment, a power plant with a retrofitted industrial gas turbine engine capable of producing greater power and at high efficiency includes: an original main compressor driven by a high pressure turbine with a high pressure combustor; a replacement inlet on the original main compressor, the replacement inlet being capable of producing a greater compressed air flow than an original inlet of the original main compressor; an original electric generator; a low spool with one of a new low pressure turbine and an original power turbine driven by exhaust gas from the high pressure turbine, and a new low pressure compressor driven by the low pressure turbine; a new compressed air line connecting the new low pressure compressor to the replacement inlet of the original main compressor; and a new variable inlet guide vane assembly for the one of the new low pressure turbine and the original power turbine.

In one aspect of the embodiment, the original main compressor is without at least one stage of stator vanes and rotor blades such that a pressure ratio is optimally matched between the original main compressor and the new low pressure compressor.

In one aspect of the embodiment, the high pressure turbine has at least one row of new stator vanes with a closed loop cooling circuit, and the power plant further includes: a source of compressed cooling air; and a compressed air cooling circuit to deliver compressed cooling air to the closed loop cooling circuit of the stator vanes and discharge spent cooling air in front of the high pressure combustor.

In one aspect of the embodiment, the power plant further includes: a new boost compressor between the source of compressed cooling air and the at least one row of new stator vanes to increase the pressure of the cooling air; and a new intercooler between the source of compressed cooling air and the at least one row of new stator vanes to cool the compressed cooling air.

In one aspect of the embodiment, the power plant further includes a new electric generator driven by the original main compressor, the new electric generator replacing the original electric generator and having a greater electrical power production than the original electric generator.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The present invention is a process for retrofitting an industrial gas turbine engine of a power plant for increased power and efficiency.

Figure 1:
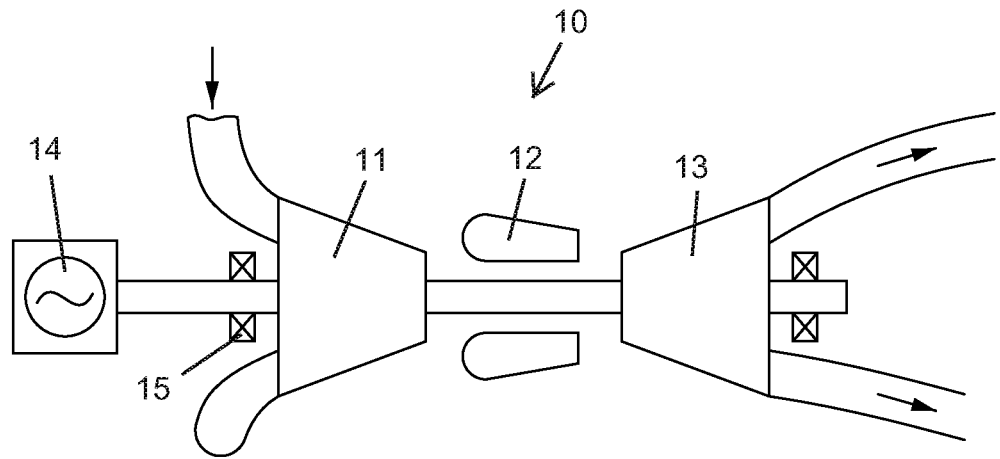
FIG. 1 shows a single shaft industrial gas turbine engine that drives an electric generator of the prior art.

In the present invention, existing single shaft industrial gas turbine engines 10 like that shown in FIG. 1 are retrofitted with a low pressure turbine (which may also be referred to as a low speed turbine, LST) coupled to a low pressure compressor (which may also be referred to as a low speed compressor, LSC) that is aerodynamically coupled in front of the existing compressor, now deemed the high pressure compressor (HPC), where the existing turbine (now deemed the high pressure turbine or HPT), is coupled aerodynamically to the low pressure turbine. The existing single shaft industrial gas turbine engine 10 includes a compressor 11 driven by a turbine 13 with a combustor 12, and an electric generator 14 driven by the rotor on the cold side which is in front of, or upstream of, the compressor 11. Bearings 15 support the rotor of the engine. This industrial gas turbine engine 10 may be referred to herein as being the "original" industrial gas turbine engine 10 to which modifications and enhancements disclosed herein may be added.

Further enhancements to the cooling systems enable the ability to increase the firing temperature of the existing section of the gas turbine and elevate the overall power rating and efficiency. The retrofit-able upgrade consists of several optional elements. Most or all of the cooling air used to cool turbine airfoils is discharged into the combustor upstream of the flame instead of into the hot gas path of the turbine (for example, as shown with the arrows in FIG. 1) in order to improve the efficiency of the engine. In one embodiment, some of the turbine airfoil cooling air can be discharged through trailing edge exit holes and into the hot gas stream with most of the spent cooling air being discharged into the combustor. Passing cooling air through the turbine airfoil for cooling and then discharging most or all of the spent cooling air is referred to as a closed loop cooling where the cooling circuit in the turbine airfoil is a closed loop instead of an open loop in which all of the cooling air is discharged out from the airfoil and into the hot gas stream through film holes or exit holes in the airfoil.

Figure 2:
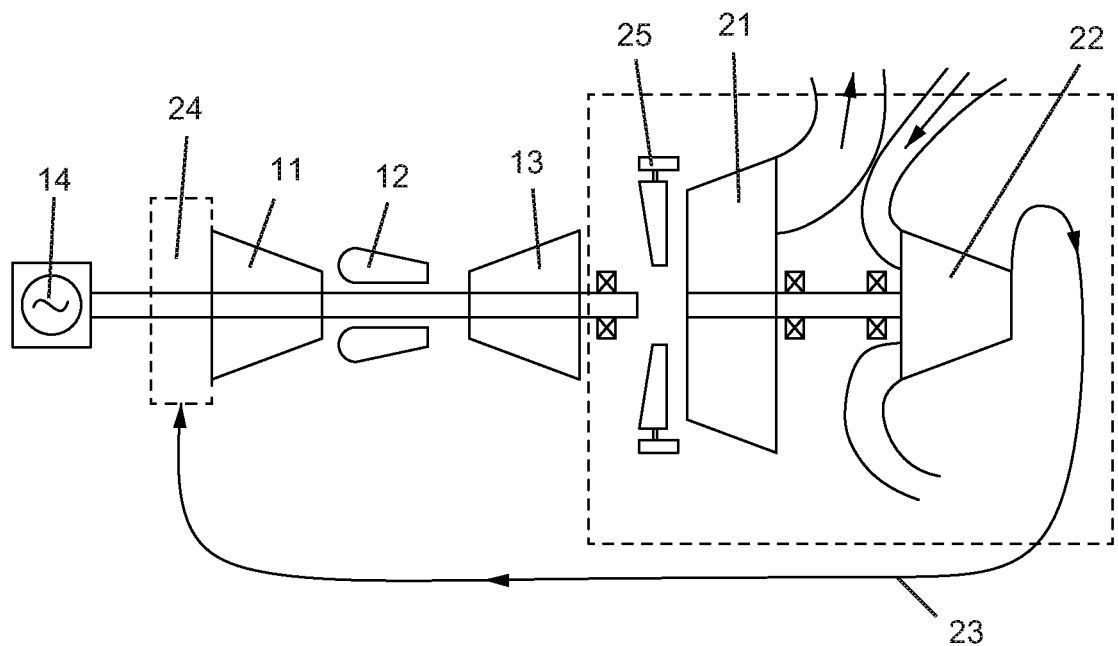
FIG. 2 shows a retrofitted industrial gas turbine engine with a low speed, low pressure turbine and low pressure compressor of the present invention.

The first upgrade element is to introduce a low pressure turbine 21 (which may also be referred to herein as a low speed turbine) directly driving a low pressure compressor 22 (which may also be referred to herein as a low speed compressor), which components are coupled aerodynamically to the existing single shaft industrial gas turbine engine (IGTE) 10, such as that shown in FIG. 1. Components of the existing or original single shaft industrial gas turbine engine 10, such as the compressor, combustor, and turbine, may be referred to herein as the main compressor 11, the main combustor 12, and the main turbine 13. The existing industrial gas turbine exhaust system (which includes at least one stage of rotor blades and stator vanes) is removed from the main compressor 11 and replaced with a close coupled turbine section 21, 22 featuring a variable area low pressure turbine stator vane (variable turbine inlet guide vanes 25, which may also be referred to herein as a variable inlet guide vane assembly 25). The variable inlet guide vanes 25 are added to the inlet side of, or upstream of, the low pressure turbine 21. This variable area low pressure turbine stator vane is used in conjunction with the low pressure compressor variable geometry, inlet guide vane and variable geometry, and stator guide vanes part of the low pressure compressor 22 to control the low shaft speed and to simultaneously match the speeds of the low pressure compressor and the high pressure 22 compressor (main compressor 11) for aerodynamic performance (FIG. 2). That is, the removal of the existing industrial gas turbine exhaust system and its replacement by the variable inlet guide vane assembly 25 may match a pressure ratio split between the low pressure compressor (22) and the main compressor (11).

The discharge of the low pressure compressor 22 is connected aerodynamically to the inlet of the existing compressor 11, now the high pressure compressor 11, through a compressed air line 23, boosting the overall pressure ratio of the engine. The main or original electric generator 14 connected to the original gas turbine engine 10 is now defined as being on the high speed shaft, as the new low pressure turbine 21 and low pressure compressor 22 are included in the low speed shaft.

Figure 3:
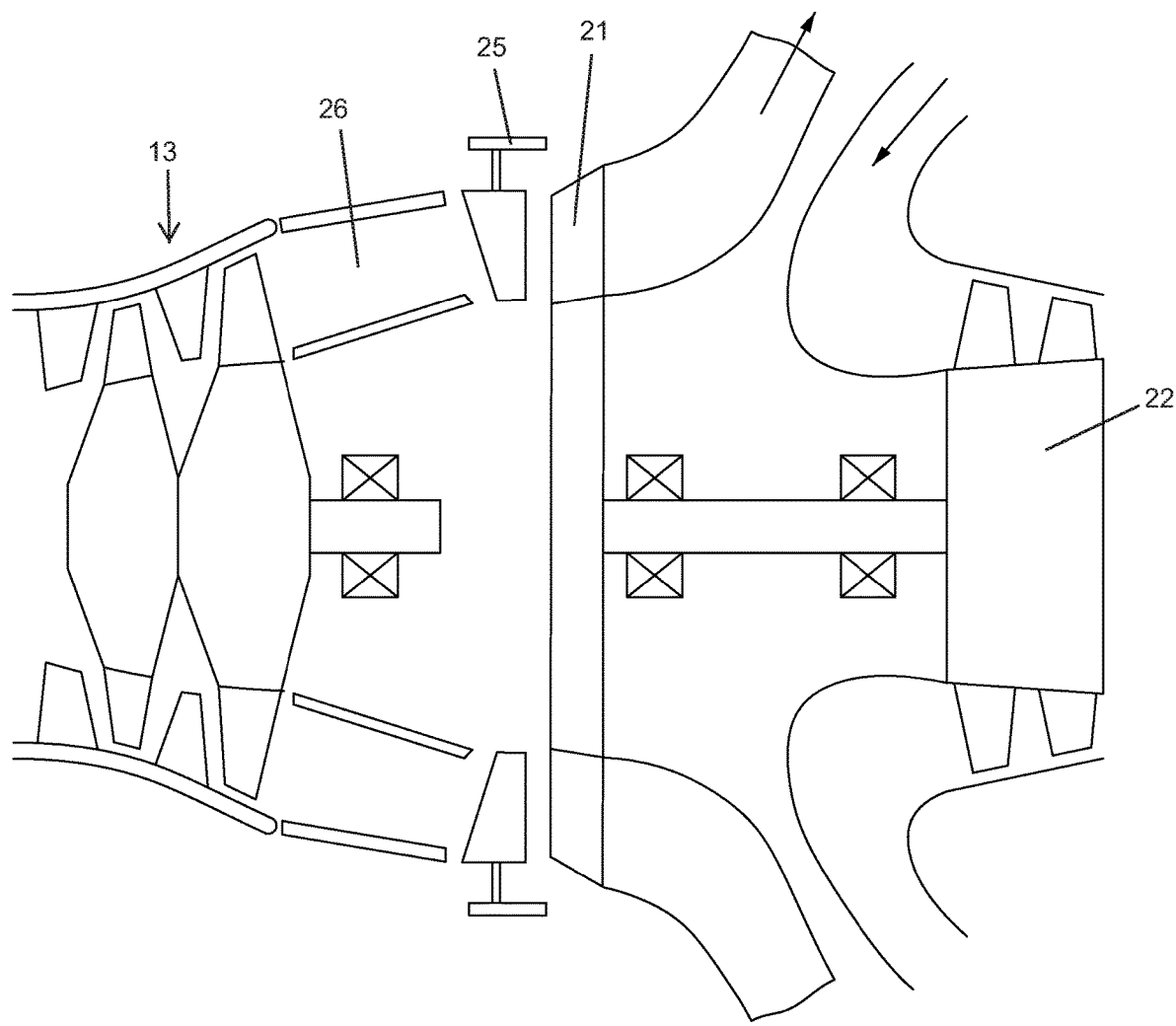
FIG. 3 shows a turbine exhaust system for a retrofitted engine of the present invention.

The original gas turbine engine 10 has the exhaust diffuser removed and is close coupled to the new low pressure gas turbine 21 with the variable area inlet guide vanes 25. The flow discharging the original turbine 13 now enters the variable area inlet guide vanes 25, then passing across the low pressure turbine 21 and out the new exhaust system (FIG. 3). A turbine exhaust duct 26 is installed to pass the high pressure exhaust from the high pressure turbine 13 into the low pressure turbine 21 and variable area inlet guide vanes 25.

Figure 4:
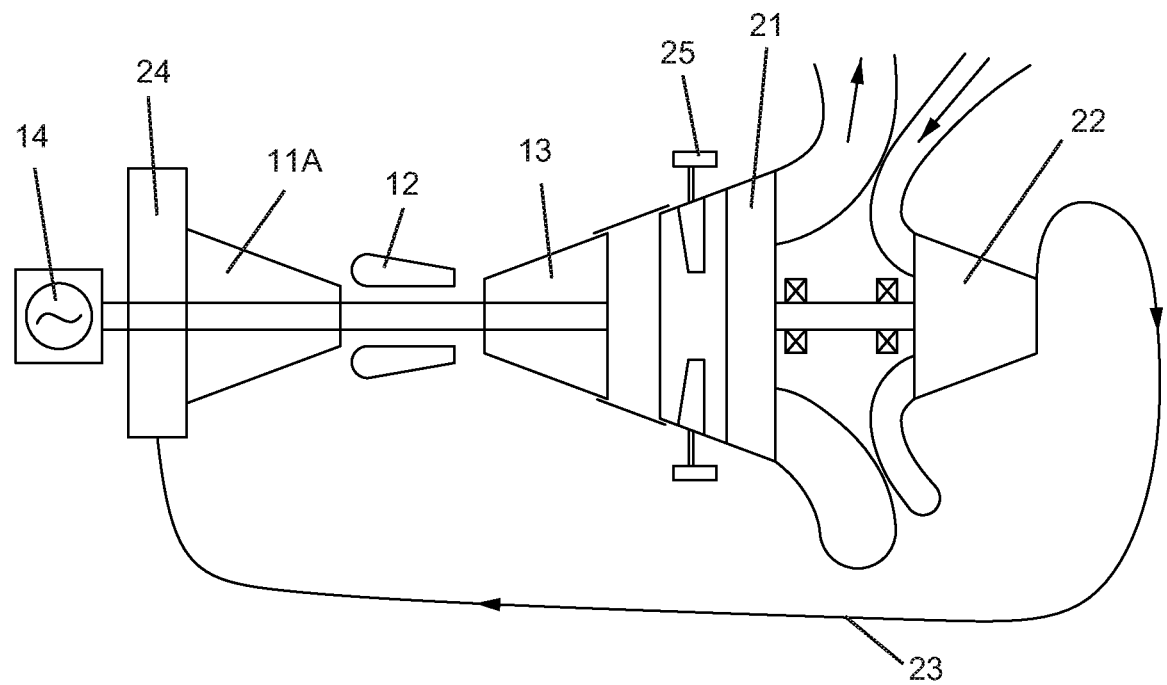
FIG. 4 shows a single shaft retrofitted industrial gas turbine engine with at least one of the high pressure compressor stages removed.

The retrofit in this configuration can increase the existing industrial engines overall pressure ratio significantly, a range from 1.1 to even over 7×, thus greatly enhancing the engines mass flow and power output. The upgrade including the new low pressure gas turbine 21 may entail removing one or more of the front high pressure compressor blading stages 11A to optimally match the pressure (and speed) ratio split between the low pressure compressor 22 and high pressure compressor 11A (FIG. 4). A new inlet 24 to the high pressure compressor 11A is also added to receive the compressed air from the low pressure compressor 22. To get the maximum power out of the upgraded engine and higher efficiency at low power modes, variable inlet guide vane assemblies are used in the high pressure compressor 11A and the low pressure compressor 22 and the low pressure turbine 21 (for example, the variable area inlet guide vanes 25) in order to control flows.

Figure 5:
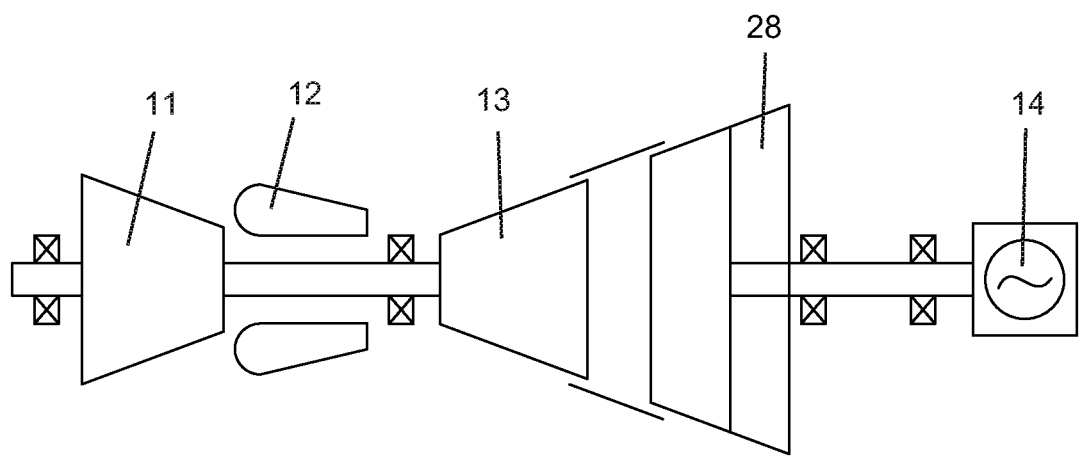
FIG. 5 shows a prior art two shaft industrial gas turbine engine with a low pressure power turbine driving an electric generator.
Figure 6:
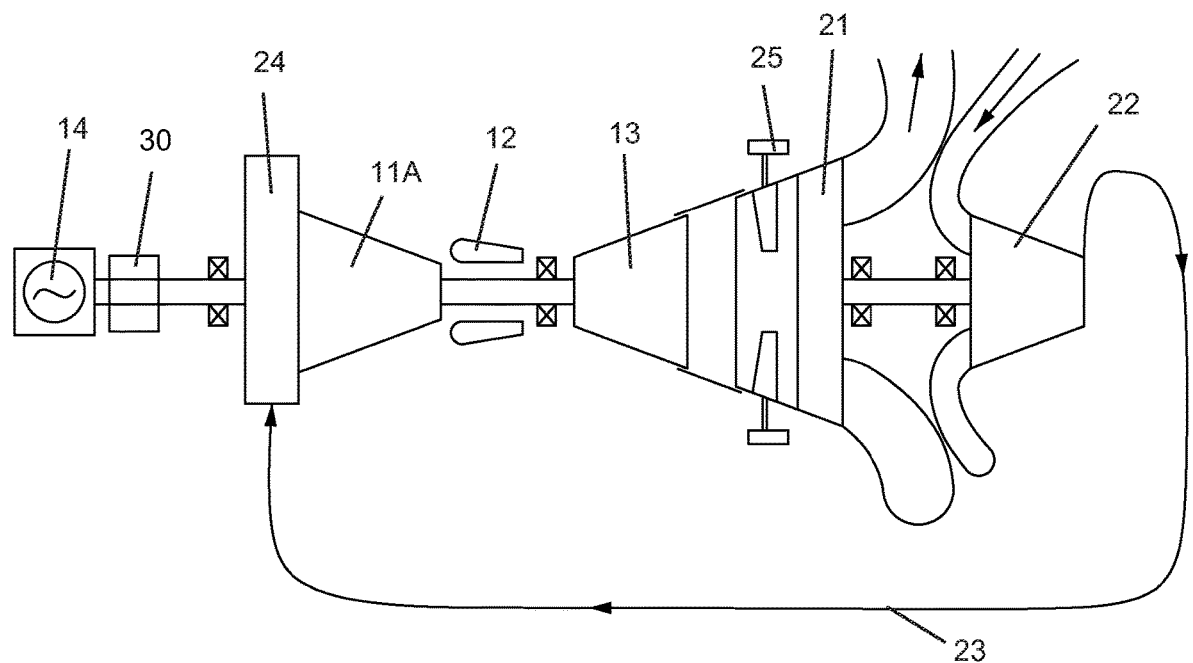
FIG. 6 shows a retrofitted two shaft industrial gas turbine engine with an electric generator and an optional gearbox on the high speed shaft of the present invention.

An alternate embodiment of this invention is to retrofit a two shaft gas turbine, where the high speed shaft has a compressor 11, combustor 12, and turbine 13 on one shaft (which may be referred to herein as a main compressor 11, main combustor 12, and main turbine 13), and a low pressure turbine (power turbine) 28 driving a generator 14 or mechanically driven equipment (pump, process compressor, etc.) as shown in the FIG. 5 embodiment. The power turbine 28 may be driven by the main turbine 13. In the FIG. 6 embodiment, the low pressure or power turbine 28 is used to drive a low pressure compressor 22 that is connected aerodynamically to the existing compressor 11 (now deemed the high pressure compressor 11) through compressed air line 23. The generator 14 (or other mechanically driven equipment) may be moved to the high speed shaft connected on the cold end of, or upstream of, the high pressure compressor 11. Additionally, a gearbox 30 may also be added in the FIG. 6 embodiment, one or more stages of the front of the high pressure compressor 11 would be removed in order to match a pressure (or speed) ratio split between the low pressure compressor 22 and the high pressure compressor 11. Additionally, a new inlet 24 (which may also be referred to herein as a replacement inlet 24) is added to the compressor 11 and replaces an original inlet of the compressor 11. The new inlet 24 is configured to receive a greater air flow than the original inlet.

In the process for retrofitting the prior art IGT engines in FIGS. 1 and 5, the old or original electric generator 14 would require replacement since the retrofitted IGT engine would then produce around twice the power as the old engine and thus require a new electric generator. For example, if a prior art IGT single spool engine of FIG. 1, which is capable of producing 300 MW of power, is retrofitted, the new IGT engine would be capable of producing twice that power (or 600 MW). Thus, the old 300 MW electric generator would need to be replaced with a new 600 MW electric generator 14. The old 300 MW electric generator could be reused, but a second 300 MW generator would have to be added in which both generators would be driven by the same output shaft. This modification would probably be more costly than replacing the old 300 MW generator with a new modern 600 MW generator. In limited upgrade cases, the old electric generator can still be used with a slightly more powerful industrial engine upgrade. The electric generator 14 is chosen that has the capability of producing more electrical energy than the IGT engine operating at a standard operating temperature so that when a cold day occurs and the engine can produce more power, the electric generator can produce more power. Thus, if an IGT engine upgrade does not produce more power than the electric generator is capable of producing, then the old electric generator 14 can still be used in the upgraded IGT engine.

Figure 7:
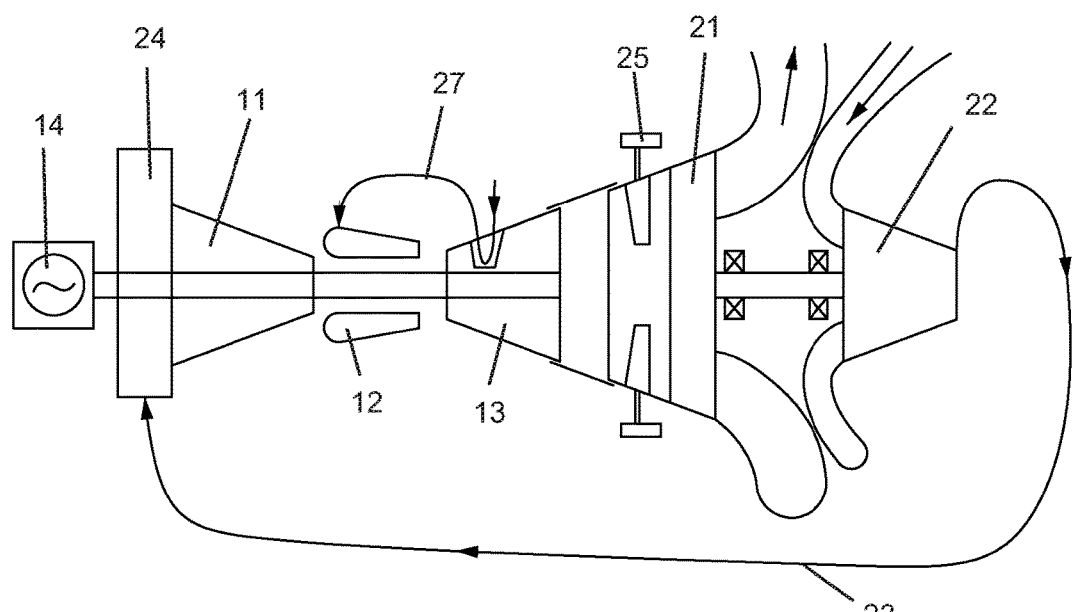
FIG. 7 shows a low spool retrofitted with a high pressure turbine having regenerative cooling of the present invention.

The second upgrade elements are cooling system retrofits and are also available to be created alone, or in combination with, the low speed spool retrofit. This use of regenerative (closed loop) cooling for the first several rows of cooled turbine vanes in the now high pressure (or main) turbine 13 are implemented where the existing turbine stator vanes with cooling flow discharges into the gas path (such as through film cooling holes or exit holes) are replaced by stator vanes that collect the post cooling coolant and return it into the combustor 12 upstream of the flame (which may be referred to herein as a cooling circuit). For example, the post cooling coolant may be from a source of compressed air. The use of the regenerative or closed loop cooling increases the thermal efficiency of the engine, and further enhances the overall power and efficiency coupled with the low pressure compressor 22 and turbine shaft (FIG. 7). Cooling air line 27 passes the spent turbine vane cooling air into the combustor 12.

The cooling system, if upgraded alone, would source cooling air from one of several places. This first option would be from ambient air such as that in FIG. 9 with the external cooling air compressor 33 (which may also be referred to herein as a boost compressor 33) driven by a motor 32 would raise the cooling air pressure to the required level.

Figure 8:
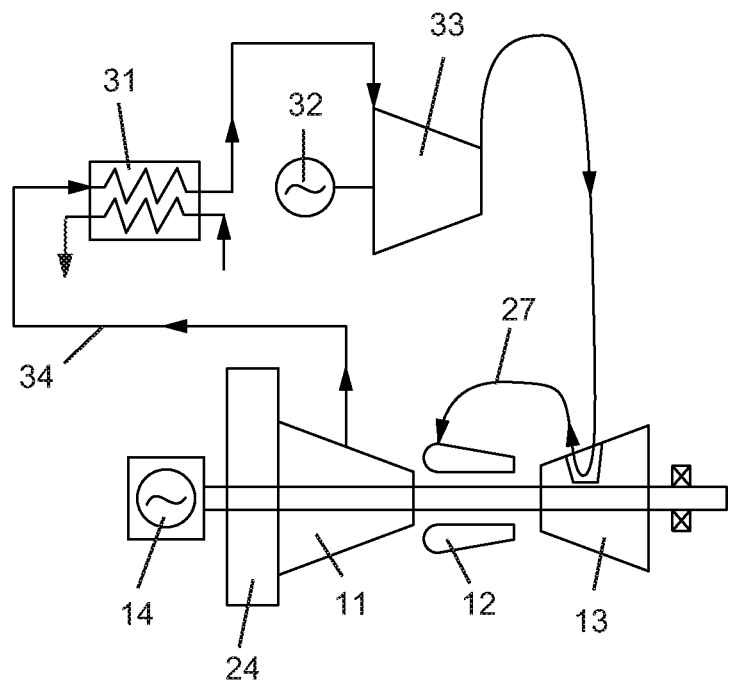
FIG. 8 shows a single shaft industrial gas turbine engine comprising a turbine vane cooling system retrofit with bleed air from the compressor intercooled and then further compressed with regenerative cooling before discharge into the combustor of the present invention.

In the FIG. 8 embodiment, the cooling air could be partially compressed (bled off from a stage of the high pressure compressor 11), intercooled with an intercooler 31, and further compressed for reduced compressor work and increased compressor efficiency, and then to reduce the cooling air compressor 33 to the desired coolant temperature. Cooling air is bled off from a stage of the compressor 11, passed through an intercooler 31, and then boosted in pressure by the external cooling air compressor 33 so that enough pressure remains in the cooling air after passing through the stator vanes of the turbine 13 in order to discharge the spent cooling air into the combustor 12. Cooling air passage 34 from the compressor 11 can come from an outlet of the compressor 11 or from an earlier stage which is at a lower pressure than the exit discharge pressure.

Figure 9:
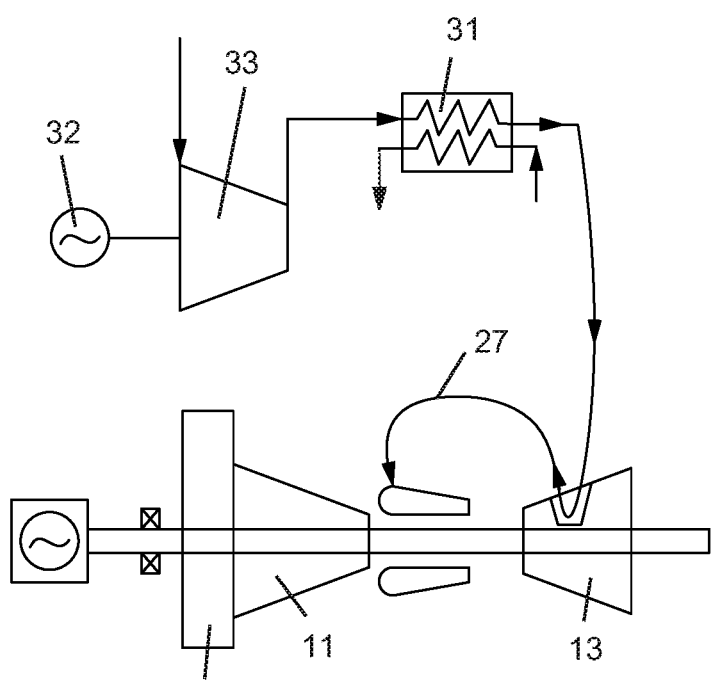
FIG. 9 shows an industrial gas turbine engine comprising a turbine vane cooling system retrofit with ambient air compressed and then cooled to provide cooling for a row of stator vanes in the turbine before discharge into the combustor of the present invention.

A second approach is shown in FIG. 9 where this ambient sourced air is compressed by an external cooling air compressor 33 and then cooled in an intercooler 31 to the desired cooling air temperature. In this second case, the cooling air work of compression is higher than in the FIG. 8 embodiment; however, the configuration could be made simpler.

Figure 10:
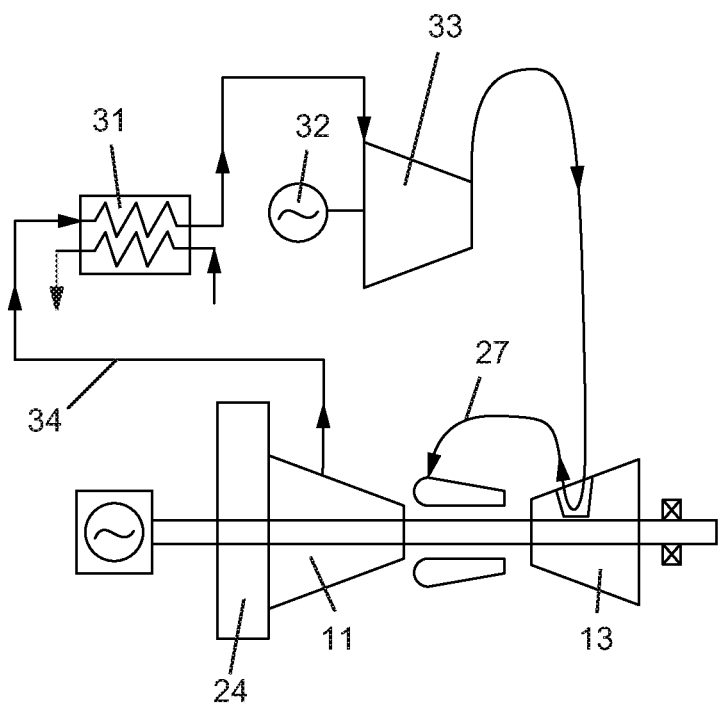
FIG. 10 shows an industrial gas turbine engine comprising a turbine vane cooling system retrofit with bleed air intercooled and then further compressed for use in turbine vane cooling and then discharged into the combustor of the present invention.
Figure 11:
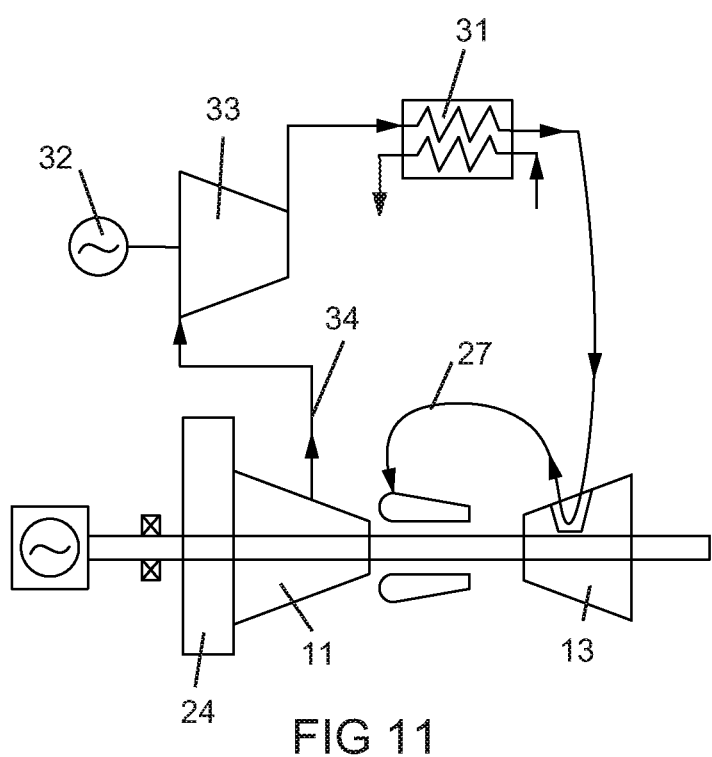
FIG. 11 shows an industrial gas turbine engine comprising a turbine vane cooling system retrofit with bleed air compressed and then intercooled for use in turbine vane cooling and then discharged into the combustor of the present invention.

In a third approach (FIG. 10), the cooling air is bled from one of the bleed ports in a middle stage of the original compressor 11 where the flow is both intercooled by the intercooler 31 and recompressed by the external cooling air compressor 33 or, in a fourth approach, the cooling air bled from the middle stage of the original compressor 11 is compressed by the external cooling air compressor 33 and after-cooled by the intercooler 31 (FIG. 11).

Figure 12:
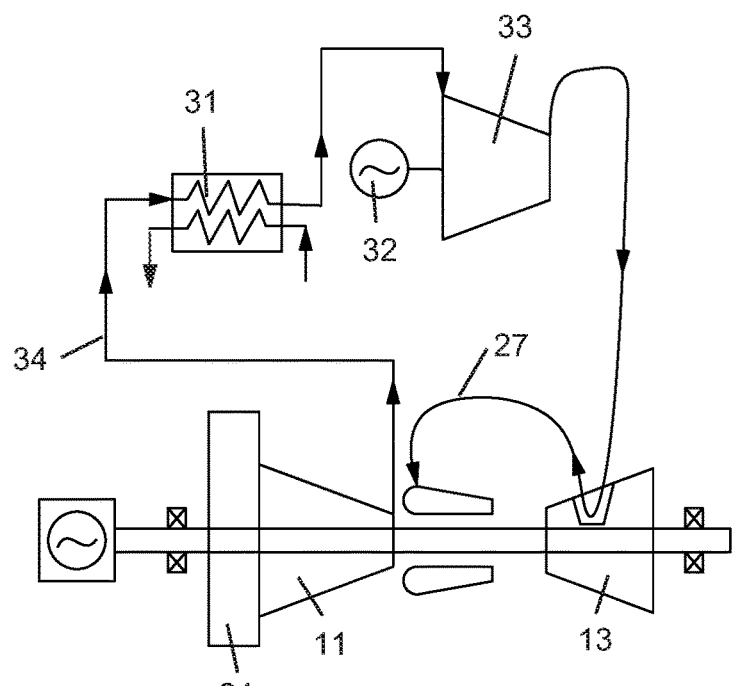
FIG. 12 shows an industrial gas turbine engine comprising a turbine vane cooling system retrofit with compressed air further compressed and then intercooled for use in turbine vane cooling and then discharged into the combustor of the present invention.
Figure 13:
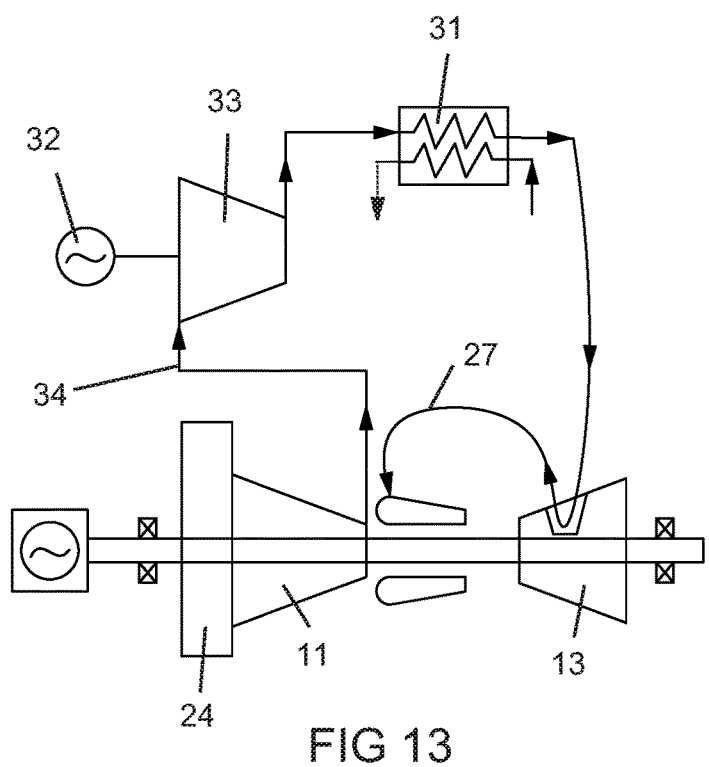
FIG. 13 shows an industrial gas turbine engine comprising a turbine vane cooling system retrofit with bleed air compressed and then intercooled for use in turbine vane cooling and then discharged into the combustor of the present invention.

In a fifth approach, the fully compressed air from the original compressor 11 is extracted (bled) from the last stage of the original compressor 11, intercooled by the intercooler 31, and then further compressed by the external cooling air compressor 33 (FIG. 12). In a sixth approach, cooling air bled from the last stage of the original compressor 11 compressed by the external cooling air compressor 33 and then after-cooled by the intercooler 31 to the desired cooling air temperature for vane cooling (FIG. 13).

In each of these cases the externally compressed cooling air is created at a pressure significantly over the main (original) compressor 11 discharge pressure, commonly designated P3. This intercooled and over pressurized coolant provides optimized low temperature high pressure coolant to the turbine stator vanes to provide cooling of the vanes to the desired level while the captured cooling flow exiting the vane outlets with positive pressure margin to pass it into the combustor shell to mix with the existing compressor discharge air.

This configuration of closed loop air cooing (meaning most or all of the airfoil cooling air is discharged into the combustor instead of the hot gas stream through the turbine) optimized thermal efficiency and augments power by increasing the overall flow through the combustor while preventing coolant from diluting the main hot gas stream. By closed loop cooling of the turbine airfoil, the present invention means that most or all of the spent cooling air passing through the turbine airfoils is discharged into the combustor instead of being discharged into the hot gas stream.

In the cases where the regenerative turbine vane cooling implemented on the high pressure turbine 13 is coupled with the low pressure turbine 21 and low pressure compressor 22 on the low speed spool, the cooling air source could be from the low pressure compressor 22 discharge, or from an intermediate low pressure compressor bleed, high pressure compressor bleed, or the high pressure compressor discharge.

In one embodiment, a process for retrofitting an industrial gas turbine engine (10) of a power plant, the industrial gas turbine engine (10) having a main compressor (11) driven by a main turbine (13), a power turbine (28) driven by the main turbine (13), and main electric generator (14) driven by one of the main compressor (11) and the power turbine (28), the main compressor (11) having an original inlet, includes the steps of: adding a new inlet (24) to the main compressor (11), the new inlet (24) replacing the original inlet and being capable of receiving a greater air flow than the original inlet; adding a low spool with a low pressure turbine (21) and a low pressure compressor (22), the low pressure turbine (21) driving the low pressure compressor (22) to the main turbine (13) such that the low pressure turbine (21) is driven by exhaust from the main turbine (13); adding a variable inlet guide vane assembly (25) to an inlet side of the low pressure turbine (21); adding a compressed air line (23) connecting the low pressure compressor (22) to the new inlet (24) of the main compressor (11) such that compressed air from the low pressure compressor (22) flows into the main compressor (11); and replacing the main electric generator (14) with a new electric generator that has around twice the electrical power production.

In one aspect of the embodiment, the method further includes the step of removing at least one stage of rotor blades and stator vanes from the main compressor (11) to optimally match a pressure ratio split between the low pressure compressor (22) and the main compressor (11).

In one aspect of the embodiment, the method further includes the steps of: removing at least one stage of the stator vanes form the main turbine (13); installing at least one new row of stator vanes in the main turbine (13) in which the new stator vanes have a closed loop cooling circuit; providing a source of compressed air for cooling of the new row of turbine stator vanes; and discharging spent cooling air from the new row of stator vanes into the main combustor (12), the main combustor (12) producing a hot gas stream for the main turbine (13).

In one aspect of the embodiment, the method further includes the steps of: bleeding off cooling air from the main compressor (11); intercooling the cooling air with an intercooler (31); increasing a pressure of the cooling air to a pressure slightly higher than an outlet pressure of the main compressor (11) to produce a higher pressure cooling air; and passing the higher pressure cooling air through the closed loop cooling circuit in the new stage of turbine stator vanes.

In one aspect of the embodiment, the method further includes the steps of: compressing ambient air with an external cooling air compressor (33) to a pressure slightly higher than an outlet pressure of the main compressor (11) to produce a higher pressure cooling air; intercooling the cooling air with an intercooler (31); and passing the higher pressure cooling air through the closed loop cooling circuit in the new stage or stages of turbine stator vanes.

In one aspect of the embodiment, the method further includes the steps of: bleeding off compressed cooling air from an outlet of the main compressor (11); intercooling the compressed cooling air with an intercooler (31); increasing a pressure of the compressed cooling air to a pressure slightly higher than an outlet pressure of the main compressor (11) to produce a higher pressure cooling air; and passing the higher pressure cooling air through the closed loop cooling circuit in the new stage of turbine stator vanes.

In one aspect of the embodiment, the method further includes the steps of: bleeding off compressed cooling air from an outlet of the main compressor (11); increasing a pressure of the compressed cooling air to a pressure slightly higher than an outlet pressure of the main compressor (11) to produce a higher pressure cooling air; intercooling the higher pressure cooling air with an intercooler (31); and passing the higher pressure cooling air through the closed loop cooling circuit in the new stage or stages of turbine stator vanes.

In one aspect of the embodiment, the method further includes the steps of: bleeding off at least a portion of compressed air from the source of compressed air between the low pressure compressor (22) and the main compressor (11) for use as the cooling air for the at least one new row of stator vanes; and cooling and compressing the cooling air to a pressure slightly higher than an outlet pressure of the main compressor (11).

In one aspect of the embodiment, the method further includes the step of adding a variable inlet guide vane assembly (25) to both the main compressor (11) and the low pressure compressor (22).

In one embodiment, a process for retrofitting an industrial gas turbine engine (10) of a power plant of claim 1, of the industrial gas turbine engine (10) having a main compressor (11) driven by a main turbine (13), a power turbine driven by the main turbine (13), and a main electric generator (14) driven by one of the main compressor (11) and the power turbine (28), the main compressor having an original inlet, includes the steps of: removing the main electric generator (14) from the power turbine (28); adding a new inlet (24) to the main compressor (11), the new inlet (24) replacing the original inlet and being capable of receiving a greater air flow than the original inlet; adding a low pressure compressor (22) to be driven by the power turbine (28); adding a variable inlet guide vane assembly (25) to an inlet side of the power turbine (28); adding a compressed air line (23) connecting the low pressure compressor (22) to the new inlet (24) of the main compressor (11) such that compressed air from the low pressure compressor (22) flows into the main compressor (11); and adding a new electric generator (14) having around twice the electrical power production of the main electric generator (14) to be driven by the main compressor (11).

In one aspect of the embodiment, the method further includes the step of removing at least one stage of rotor blades and stator vanes from the main compressor (11) to optimally match a pressure ratio split between the low pressure compressor (22) and the main compressor (11).

In one aspect of the embodiment, the method further includes the step of adding a gearbox (30) between the new electric generator (14) and the main compressor (11).

In one embodiment, a power plant with a retrofitted industrial gas turbine engine (10) capable of producing greater power and at high efficiency includes: an original main compressor (11) driven by a high pressure turbine (13) with a high pressure combustor (12); a replacement inlet (24) on the original main compressor (11), the replacement inlet (24) being capable of producing a greater compressed air flow than an original inlet of the original main compressor (11); an original electric generator (14); a low spool with one of a new low pressure turbine (21) and an original power turbine (28) driven by exhaust gas from the high pressure turbine (13), and a new low pressure compressor (22) driven by the low pressure turbine (21); a new compressed air line (23) connecting the new low pressure compressor (22) to the replacement inlet (24) of the original main compressor (11);

and a new variable inlet guide vane assembly (25) for the one of the new low pressure turbine (21) and the original power turbine (28).

In one aspect of the embodiment, the original main compressor (11) is without at least one stage of stator vanes and rotor blades such that a pressure ratio is optimally matched between the original main compressor (11) and the new low pressure compressor (22).

In one aspect of the embodiment, the high pressure turbine (13) has at least one row of new stator vanes with a closed loop cooling circuit, and the power plant further includes: a source of compressed cooling air; and a compressed air cooling circuit to deliver compressed cooling air to the closed loop cooling circuit of the stator vanes and discharge spent cooling air into the high pressure combustor (12).

In one aspect of the embodiment, the power plant further includes: a new boost compressor (33) between the source of compressed cooling air and the at least one row of new stator vanes to increase the pressure of the cooling air; and a new intercooler (31) between the source of compressed cooling air and the at least one row of new stator vanes to cool the compressed cooling air.

In one aspect of the embodiment, the power plant further includes a new electric generator (14) driven by the original main compressor (11), the new electric generator (14) replacing the original electric generator (14) and having a greater electrical power production than the original electric generator (14).

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A process for retrofitting an industrial gas turbine engine of a power plant, the industrial gas turbine engine having a main compressor driven by a main turbine and a main electric generator driven by the main turbine, the main compressor having an original inlet, the process comprising the steps of:
    adding a new inlet to the main compressor, the new inlet replacing the original inlet and being capable of receiving a greater air flow than the original inlet;
    adding a low spool with a low pressure turbine and a low pressure compressor, the low pressure turbine driving the low pressure compressor to the main turbine such that the low pressure turbine is driven by exhaust from the main turbine;
    adding a variable inlet guide vane assembly to an inlet side of the low pressure turbine;
    adding a compressed air line connecting the low pressure compressor to the new inlet of the main compressor such that compressed air from the low pressure compressor flows into the main compressor; and
    removing at least one stage of rotor blades and stator vanes from the main compressor.

2. The process for retrofitting the industrial gas turbine engine of the power plant of claim 1, the industrial gas turbine engine of the power plant further having a main combustor, the process further comprising the steps of:
    installing at least one new row of turbine stator vanes in the main turbine in which the at least one new row of turbine stator vanes have a closed loop cooling circuit;
    providing a source of compressed cooling air for cooling of the at least one new row of turbine stator vanes, the source of compressed cooling air corresponding to one of the compressed air from the low pressure compressor and compressed air from a cooling air compressor different from the low pressure compressor and main compressor; and discharging spent cooling air from the new row of turbine stator vanes upstream of the main combustor, the main combustor producing a hot gas stream for the main turbine.

3. The process for retrofitting the industrial gas turbine engine of the power plant of claim 2, and further comprising the steps of:
    bleeding off the compressed cooling air from the main compressor;
    intercooling the compressed cooling air with an intercooler;
    increasing a pressure of the compressed cooling air to a pressure higher than an outlet pressure of the main compressor to produce a higher pressure cooling air; and
    passing the higher pressure cooling air through the closed loop cooling circuit in the at least one new row of turbine stator vanes.

4. The process for retrofitting the industrial gas turbine engine of the power plant of claim 2, and further comprising the steps of:
    compressing ambient air with an external cooling air compressor to a pressure higher than an outlet pressure of the main compressor to produce a higher pressure cooling air;
    intercooling the higher pressure cooling air with an intercooler; and
    passing the higher pressure cooling air through the closed loop cooling circuit in the at least one new row of turbine stator vanes.

5. The process for retrofitting the industrial gas turbine engine of the power plant of claim 2, and further comprising the steps of:
    bleeding off the compressed cooling air from an outlet of the main compressor;
    intercooling the compressed cooling air with an intercooler;
    increasing a pressure of the compressed cooling air output by the intercooler to a pressure higher than an outlet pressure of the main compressor to produce a higher pressure cooling air; and
    passing the higher pressure cooling air through the closed loop cooling circuit in the at least one new row of turbine stator vanes.

6. The process for retrofitting the industrial gas turbine engine of the power plant of claim 2, and further comprising the steps of:
    bleeding off the compressed cooling air from an outlet of the main compressor;
    increasing a pressure of the compressed cooling air to a pressure higher than an outlet pressure of the main compressor to produce a higher pressure cooling air;
    intercooling the higher pressure cooling air with an intercooler; and
    passing the higher pressure cooling air through the closed loop cooling circuit in the at least one new row of turbine stator vanes.

7. The process for retrofitting the industrial gas turbine engine of the power plant of claim 2, and further comprising the steps of:
bleeding off at least a portion of the compressed air for use as the compressed cooling air for the at least one new row of turbine stator vanes; and
cooling and compressing the compressed cooling air to a pressure higher than an outlet pressure of the main compressor.

8. The process for retrofitting the industrial gas turbine engine of the power plant of claim 1, and further comprising the steps of:
adding a variable inlet guide vane assembly to both the main compressor and the low pressure compressor.

9. The process for retrofitting the industrial gas turbine engine of the power plant of claim 1, further comprising the step of:
replacing the main electric generator with a new electric generator that has a greater electrical power production than the main electric generator.

10. A process for retrofitting an industrial gas turbine engine of a power plant, the industrial gas turbine engine having a main compressor driven by a main turbine, a power turbine driven by the main turbine, and a main electric generator driven by one of the main turbine and the power turbine, the main compressor having an original inlet, the process comprising the steps of:
adding a new inlet to the main compressor, the new inlet replacing the original inlet and being capable of receiving a greater air flow than the original inlet;
adding a low pressure compressor to be driven by the power turbine;
adding a variable inlet guide vane assembly to an inlet side of the power turbine;
adding a compressed air line connecting the low pressure compressor to the new inlet of the main compressor such that compressed air from the low pressure compressor flows into the main compressor; and
removing at least one stage of rotor blades and stator vanes from the main compressor.

11. The process for retrofitting the industrial gas turbine engine of the power plant of claim 10, further comprising the steps of:
removing the main electric generator from the power turbine; and
adding a new electric generator to be driven by the main compressor, the new electric generator having a greater electrical power production than the main electric generator.

12. The process for retrofitting the industrial gas turbine engine of the power plant of claim 11, and further comprising the steps of:
adding a gearbox between the new electric generator and the main compressor.

13. A power plant with a retrofitted industrial gas turbine engine, the power plant comprising:
an original main compressor driven by a high pressure turbine with a high pressure combustor;
a replacement inlet on the original main compressor, the replacement inlet being capable of producing a greater compressed air flow than an original inlet of the original main compressor;
an original electric generator;
a low spool with one of a new low pressure turbine and an original power turbine driven by exhaust gas from the high pressure turbine, and a new low pressure compressor driven by the low pressure turbine;
a new compressed air line connecting the new low pressure compressor to the replacement inlet of the original main compressor;
a new variable inlet guide vane assembly for the one of the new low pressure turbine and the original power turbine; and
the original main compressor having been modified by removal of at least one stage of stator vanes and rotor blades.

14. The power plant of claim 13, wherein the high pressure turbine has at least one row of new stator vanes with a closed loop cooling circuit, the power plant further comprising:
a source of compressed cooling air; and
a compressed air cooling circuit to deliver compressed cooling air to the closed loop cooling circuit of the at least one row of new stator vanes and discharge spent cooling air in front of the high pressure combustor.

15. The power plant of claim 14, and further comprising:
a new boost compressor between the source of compressed cooling air and the at least one row of new stator vanes to increase the pressure of the compressed cooling air; and
a new intercooler between the source of compressed cooling air and the at least one row of new stator vanes to cool the compressed cooling air.

* * * * *